(12) United States Patent
Shirali et al.

(10) Patent No.: US 7,532,563 B1
(45) Date of Patent: May 12, 2009

(54) MECHANISM TO IMPROVE QUALITY OF CHANNEL ESTIMATES IN OFDM TRANSMISSIONS

(75) Inventors: Kedar Shirali, Sunnyvale, CA (US); Hemanth Sampath, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 845 days.

(21) Appl. No.: 10/799,548

(22) Filed: Mar. 11, 2004

Related U.S. Application Data (60) Provisional application No. 60/525,014, filed on Nov. 25, 2003.

(51) Int. Cl.
*H04J 9/00* (2006.01)
*H04L 5/04* (2006.01)

(52) U.S. Cl. ............... 370/205; 370/203; 370/204; 370/208; 370/209; 370/210; 379/343; 375/260; 375/261; 375/264; 375/348; 375/349

(58) Field of Classification Search ............... None
See application file for complete search history.

(56) References Cited

U.S. PATENT DOCUMENTS

| | | | | |
|---|---|---|---|---|
| 2002/0003774 | A1* | 1/2002 | Wang et al. | 370/208 |
| 2002/0126618 | A1* | 9/2002 | Kim | 370/208 |
| 2003/0231715 | A1* | 12/2003 | Shoemake et al. | 375/267 |
| 2005/0075815 | A1* | 4/2005 | Webster et al. | 702/106 |

OTHER PUBLICATIONS

"IEEE P802.11g/D8.2, Draft Supplement to Standard [for] Information Technology -Telecommunications and information exchange between systems - Local and metropolitan area networks-Specific requirements - Part 11: Wireless LAN Medium Access Control (MAC) and Physical Layer (PHY) specifications: Further Higher Data Rate Extension in the 2.4 GHz Band," IEEE P802.11g/D8.2, Apr. 2003, Supplement to ANSI/IEEE Srd. 802.11 1999(Reaff 2003), pp. 1-69.
"802.16™, IEEE Standard for Local and metropolitan area networks, Part 16: Air Interface for Fixed Broadband Wireless Access Systems," IEEE Std 802.16-2001, Apr. 8, 2002, 349 pages.
"802.16™, IEEE Standard for Local and metropolitan area networks, Part 16: Air Interface for Fixed Broadband Wireless Access Systems," IEEE Std 802.16-2004 (Revision of IEEE Std 802.16-2001), Oct. 1, 2004, 893 pages.
"Supplement to IEEE Standard for Information technology - Telecommunications and information exchange between systems - Local and metropolian area networks - Specific requirements - Part 11: Wireless LAN Medium Access Control (MAC) and Physical Layer (PHY) specifications: High-speed Physical Layer in the 5 GHZ Band," IEEE Std 802.11a-1999 (Supplement to IEEE Std 802.11-1999), Approved Sep. 16, 1999, 91 pages.
Schmidl et al., "Robust Frequency and Timing Synchronization for OFDM," IEEE Transactions on Communications, vol. 45, No. 12, Dec. 1997, pp. 1613-1621.

* cited by examiner

*Primary Examiner*—William Trost IV
*Assistant Examiner*—Raj Jain (57) ABSTRACT

An OFDM (Orthogonal Frequency Division Multiplexing) system may utilize pilot symbol structures including two or more pilot symbols with pilot information on alternate tones. The pilot information in one symbol is transmitted on mirror tones in another of the symbols. The pilot symbol structure may include a copy of one of the pilot symbols to aid in frequency offset estimation.

67 Claims, 6 Drawing Sheets

MECHANISM TO IMPROVE QUALITY OF CHANNEL ESTIMATES IN OFDM TRANSMISSIONS

CROSS-REFERENCE TO RELATED APPLICATIONS

This application claims priority to U.S. Provisional Application Ser. No. 60/525,014, filed on Nov. 25, 2003.

BACKGROUND

Wireless systems may use an Orthogonal Frequency Division Multiplexing (OFDM) transmission scheme. The IEEE 802.11a/g standards describe OFDM systems and the protocols used by such systems. In an OFDM system, a data stream is split into multiple substreams, each of which is sent over a subcarrier frequency (also referred to as a "tone"). One of the advantages of OFDM systems is their ability to provide a low arithmetical complexity equalization scheme for frequency selective channels (also known as the multipath effect). The equalization is reduced in the frequency domain after demodulation by a FFT (Fast Fourier Transform) to scalar multiplications, one for each tone. This feature enables OFDM systems to use a relatively simple channel equalization method, which is essentially a one-tap multiplier for each tone.

Despite these advantages, OFDM transmissions, like other wireless transmissions, are susceptible to the effects of residual carrier offsets, phase noise, and quadrature imbalance effects. These impairments cause inter-carrier interference (ICI), which can degrade system performance. These impairments also affect the accuracy of channel estimates, which when used for channel equalization, add a secondary, but not insignificant, degradation to the quality of the equalized signals.

SUMMARY

Systems (e.g. wireless systems such as an OFDM (Orthogonal Frequency Division Multiplexing) system), methods, and apparatuses including computer-readable mediums may utilize pilot symbol structures including two pilot symbols with pilot information on alternate tones. The tones not containing pilot information may be nulled out. The pilot information in one symbol is transmitted on mirror tones in another of the symbols.

A receiver in the symbol may perform channel estimation using the two pilot symbols. The pilot symbol structure may include a copy of one of the pilot symbols to aid in frequency offset estimation.

The system may comply with the IEEE 802.11a/g standard or IEEE 802.16. The system may be a multiple-in-multiple-out (MIMO) system, a single-in-multiple-out (SIMO) system, a multiple-in-single-out (MISO) system, or a single-in-single-out (SISO) system.

DETAILED DESCRIPTION

Figure 1:
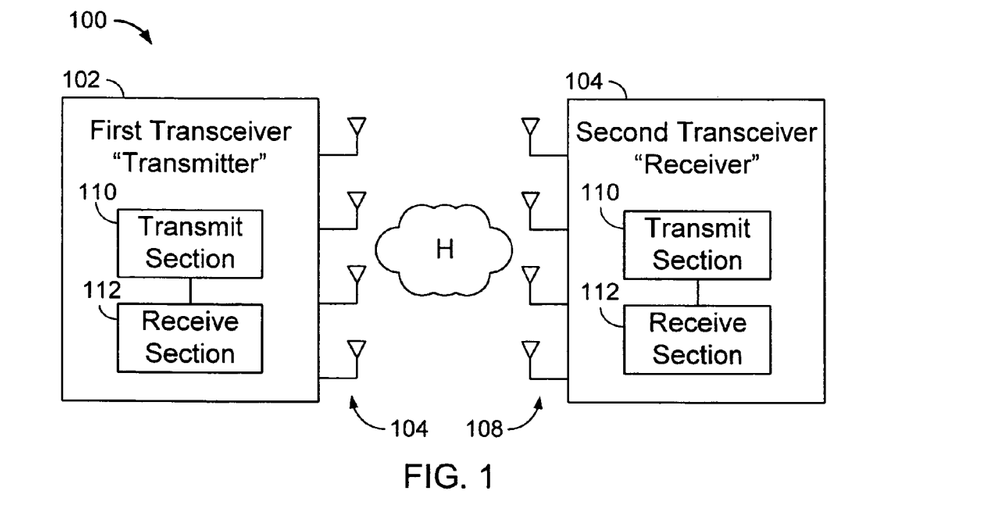
FIG. 1 is a block diagram of a wireless multiple-in-multiple-out (MIMO) communication system.

FIG. 1 illustrates a wireless multiple-in-multiple-out (MIMO) communication system 100, which includes a first transceiver 102 with $M_T$ transmit ($T_X$) antennas 104 and a second transceiver 106 with $M_R$ receive ($R_X$) antennas 108, forming an $M_R \times M_T$ MIMO system. For the description below, the first transceiver 102 is designated as a "transmitter" because the transceiver 102 predominantly transmits signals to the transceiver 106, which predominantly receives signals and is designated as a "receiver". Despite the designations, both "transmitter" 102 and "receiver" 106 may include a transmit section 110 and a receive section 112 and may transmit and receive data.

The MIMO system 100 may use an OFDM (Orthogonal Frequency Division Multiplexing) transmission scheme. The IEEE 802.11a standard describes one type of OFDM system and the protocols used by such a system. In an OFDM system, a data stream is split into multiple substreams, each of which is sent over a subcarrier frequency (also referred to as a "tone"). In IEEE 802.11a systems, OFDM symbols include 64 tones (with 48 active tones) indexed as $\{-32, -31, \ldots, -1, 0, 1, \ldots, 30, 31\}$, where 0 is the DC tone index. The DC tone is not used to transmit information.

The antennas in the transmitter 102 and receiver 106 communicate over channels in a wireless medium. In FIG. 1, H represents the reflections and multi-paths in the wireless medium, which may affect the quality of the channels. The OFDM system may perform channel estimation using known training sequences which are transmitted periodically (e.g., at the start of each frame). A training sequence may include one or more pilot symbols, i.e., OFDM symbols including only pilot information (which is known a priori at the receiver) on the subcarriers (or tones). The pilot symbol(s) are inserted in front of each transmitted frame. The receiver 106 uses the known values to estimate the medium characteristics on each of the frequency tones used for data transmission. For example, on the receiver side, the signal $Y_k$ for tone k can be written as, $$Y_k = H_k X_k + N_k,$$

where $H_k$ is the channel gain for the $k^{th}$ tone, $X_k$ is the symbol transmitted on the $k^{th}$ tone and $N_k$ is the additive noise. An estimate of the channel may be determined at the receiver by dividing $Y_k$ by $X_k$.

Figure 2:
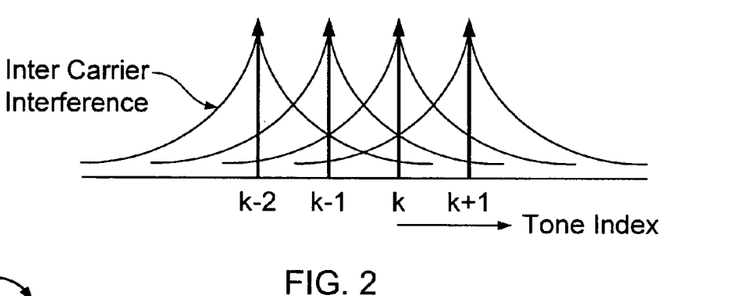
FIG. 2 is a plot showing intercarrier interference (ICI) between tones in a pilot symbol.

The additive noise $N_k$ is made up of intercarrier interference (ICI) from other tones and the front-end thermal noise. As mentioned before, ICI is caused by phase noise, residual frequency errors, and quadrature imbalance effects. The ICI due to phase noise and residual frequency errors is dominated by interference from adjacent tones, i.e., each tone is corrupted by its neighboring tones, as shown in FIG. 2. Quadrature imbalance effects cause ICI between "mirror" tones, i.e., tones which are the same distance from the DC tone (0), but on opposite sides of the DC tone. For example, quadrature imbalance will result in tone k being corrupted by tone −k, and vice versa.

In an embodiment, the pilot information sent to the receiver is split into two OFDM pilot symbols such that each symbol carries pilot information only on alternate tones. In an embodiment, the tones may be split into two tone sets S0 and S1 as follows:

S0={−32, −30, . . . , −2, 1, 3, 5, . . . , 31}
S1={−31, −29, . . . , −1, 2, 4, 6, . . . 30}

Figure 3:
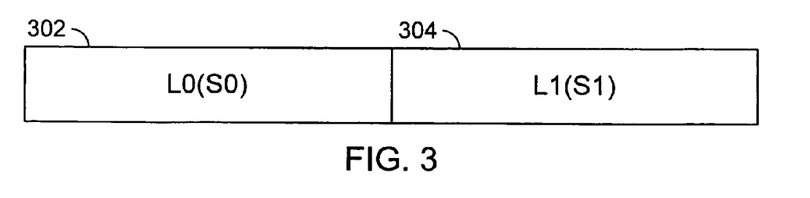
FIG. 3 illustrates a pilot symbol structure according to an embodiment.
Figure 4:
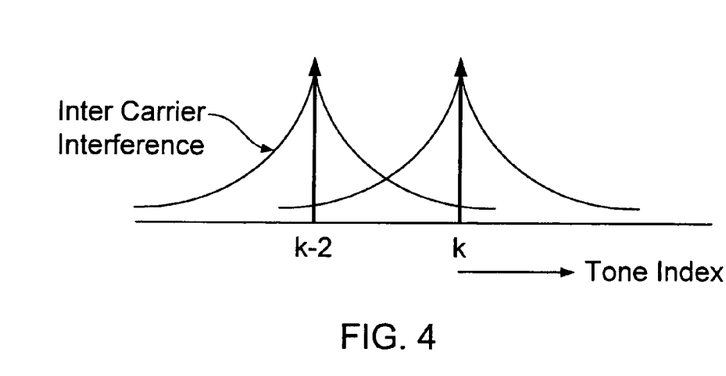
FIG. 4 is a plot showing reduced ICI between tones in a pilot symbol according to an embodiment.

The tone sets S0 and S1 are chosen such that the mirror tones for S0 are in S1 and vice versa. The pilot information may be transmitted in a pilot symbol structure 300 including two pilot symbols: pilot symbol L0 302 with tone indices from set S0 and pilot symbol L1 304 with tone indices from set S1, as shown in FIG. 3. As a result, ICI due to phase noise and residual frequency offsets may be reduced as the nulled tones do not contribute to this effect (FIG. 4). ICI due to quadrature imbalance is almost removed as the mirror tones for each pilot symbol are nulled out.

The pilot symbol structure 300 can be used to derive frequency offset estimates as well as provide noise averaging to improve the channel estimation, since the pilot information for L0 and L1 is identical in the frequency domain. Although the time domain versions of L0 and L1 may not look identical, the pilot symbol L1 304 can be viewed to be pilot symbol L0 302 modulated by $e^{-j\Omega n}$, where $\Omega$ is the tone width (or carrier spacing). Thus, the time domain versions of pilot symbols L0 and L1 may be made to look identical by compensating by $e^{-j\Omega n}$. Also, even though S0 and S1 have different numbers of tones (S0 has one more than S1), the edge tone in S0 (i.e., tone 32) may be ignored because in most OFDM systems the edge tones are nulled out to provide a guard band that allows for the decay of the signal energy.

In an embodiment, the power of the pilot symbols may be boosted by 3 dB to ensure that the OFDM signal power for the pilot symbols is the same as that in the data part of the transmission.

OFDM systems may utilize a frequency offset estimation technique in which two identical symbols are sent on two consecutive OFDM pilot symbols (or one OFDM pilot symbol including two identical halves). Such a frequency offset estimation technique is described in *Robust Frequency and Timing Synchronization for OFDM*, T. M. Schmidl and D. C. Cox, IEEE Trans. Communications, vol. 45, pp. 1613-1621, December 1997 (referred to hereinafter as "the Schmidl technique"). In the Schmidl technique, the frequency offset estimation is calculated using the phase roll between the two pilot symbols.

In a system utilizing the pilot symbol structure 300 shown in FIG. 3, the ability to estimate the frequency as well as the Schmidl technique may be compromised. Simulation results have shown that a bias in the estimate grows worse with frequency selectivity. The reason for this bias is that L0 and L1 have information on different tones and therefore excite different channels. The received signals corresponding to pilot symbols L0 and L1 may not be compatible with the Schmidl technique, which assumes that the two transmitted pilot symbols are the same. For channels with reasonably large delay spread (e.g., 50 nsec RMS delay spread in 20 MHz bandwidth), the frequency offset estimates using the pilot symbol structure 300 may be unreliable.

Figure 5:
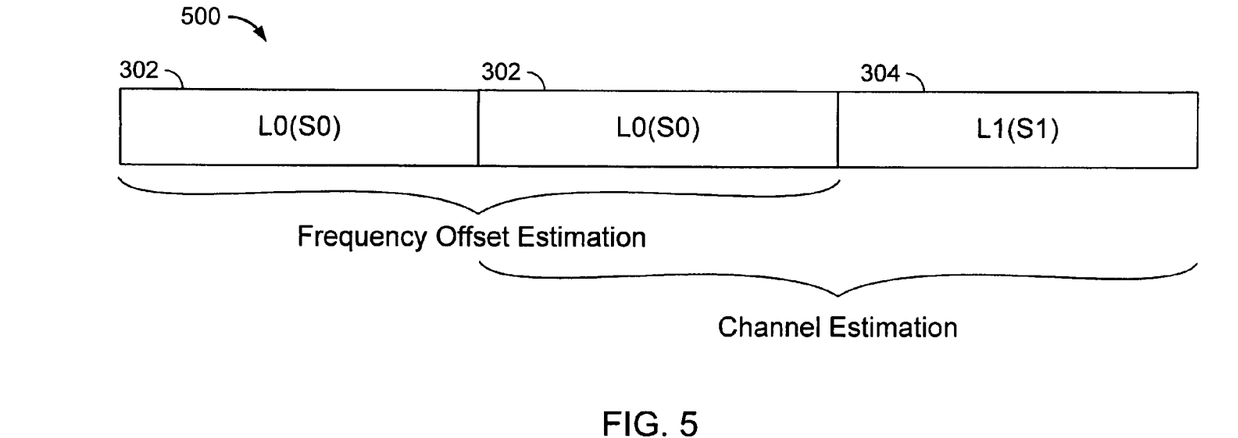
FIG. 5 illustrates a pilot symbol structure according to another embodiment.

In an embodiment, the system may utilize a pilot symbol structure 500 including three OFDM pilot symbols, as shown in FIG. 5. The structure 500 includes symbol L1 304 and two copies of pilot symbol L0 302 (and any cyclic prefixes needed to minimize the effects of intersymbol interference). The two copies of L0 may be used for frequency estimation, e.g., using the Schmidl technique, and L0, L1 can be used to obtain channel estimates.

Simulations were performed to compare the performance of the pilot symbol structures 300, 500 described above. In the simulations, the following assumptions were made: a combined phase noise with 3 dB BW 150 KHz, $\theta_{RMS}$=1.7 deg; I-Q Imbalance ($\phi$=1 deg, $\epsilon$=0.03); and Common Phase Estimation (CPE) using four pilot tones.

Figure 6:
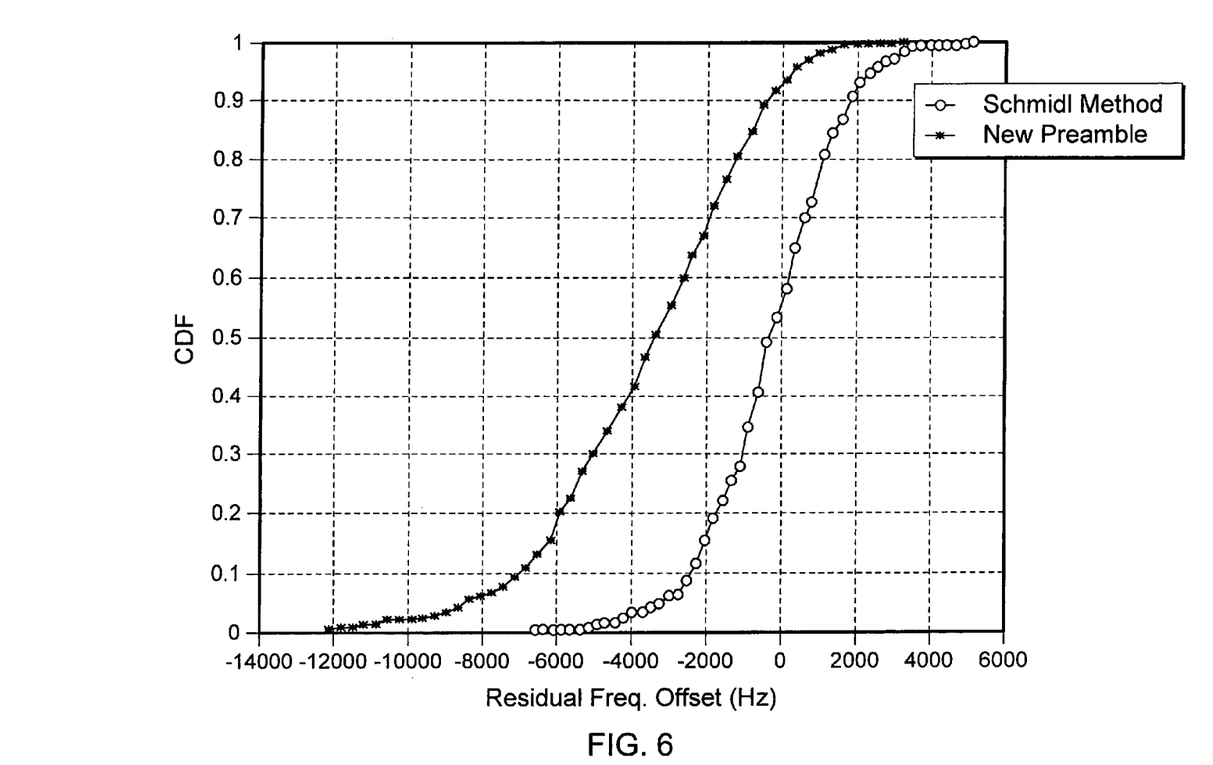
FIG. 6 is a plot showing simulated results in a multiple-in-multiple-out (MIMO) system using the pilot symbol structure shown in FIG. 3.

The performance of a simulated frequency estimator using the Schmidl technique compared to the performance of a frequency estimator using the pilot symbol structure 300 (only L0 and L1) is shown in FIG. 6. The simulated channel is indoors with a 50 nsec RMS delay spread. It is noted that for about 30% of the simulation, the use of the pilot symbol structure 300 produces a residual frequency offset $\leq$5 KHz, while the Schmidl technique produces a much smaller residual frequency offset of 51 KHz. However, for another estimated indoor channel with 15 nsec RMS delay spread, the use of the pilot symbol structure as well as the Schmidl technique produce a residual frequency offset $\leq$1 KHz. Therefore, for low delay spread channels, the pilot symbol structure 300 may yield a reliable frequency offset estimate.

Figure 7:
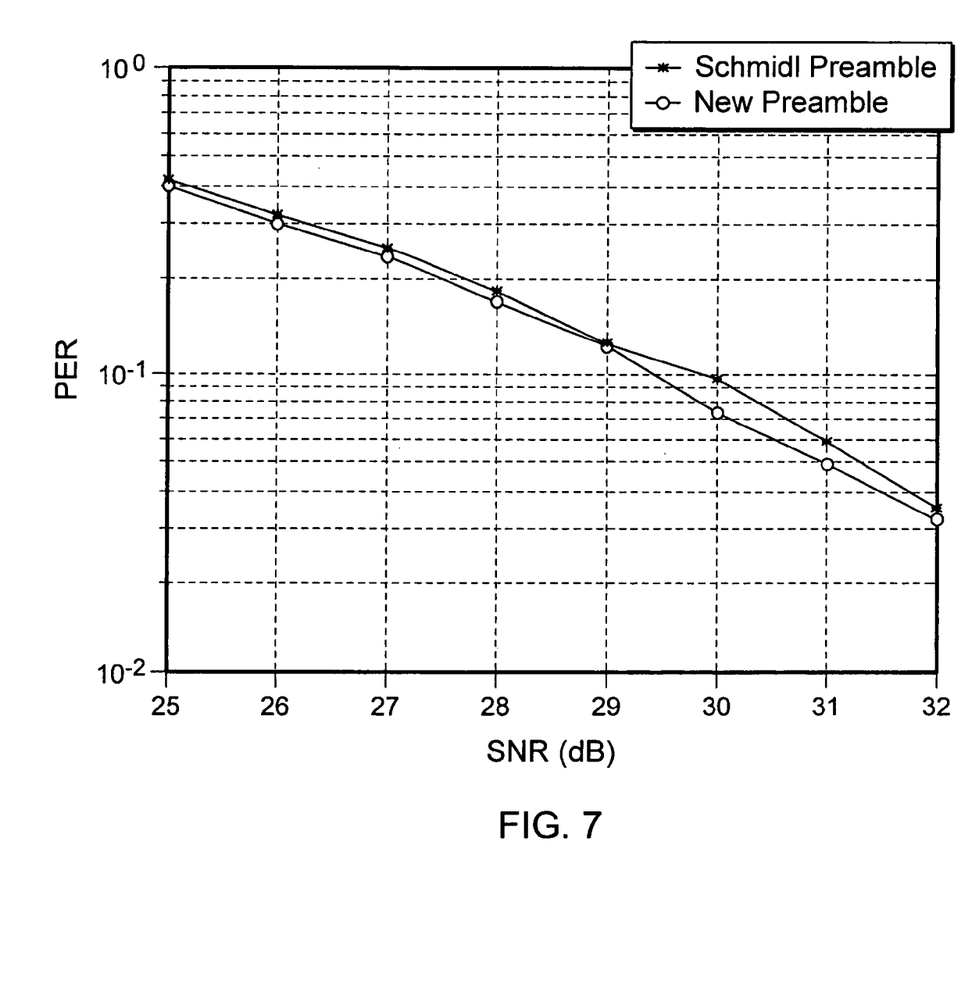
FIG. 7 is plot showing simulated results in a single-in-single-out (SISO) system using the pilot symbol structure shown in FIG. 5.
Figure 8:
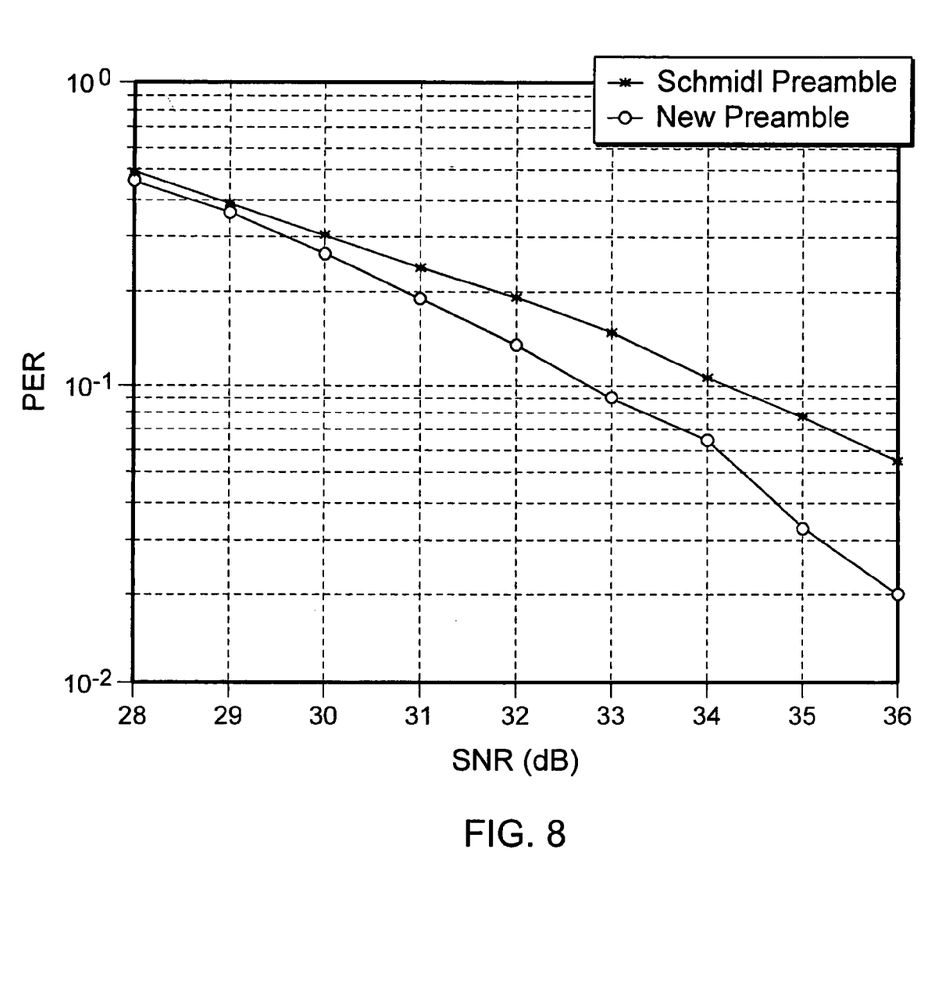
FIG. 8 is plot showing simulated results in a 2×2 MIMO system using the pilot symbol structure shown in FIG. 5.
Figure 9:
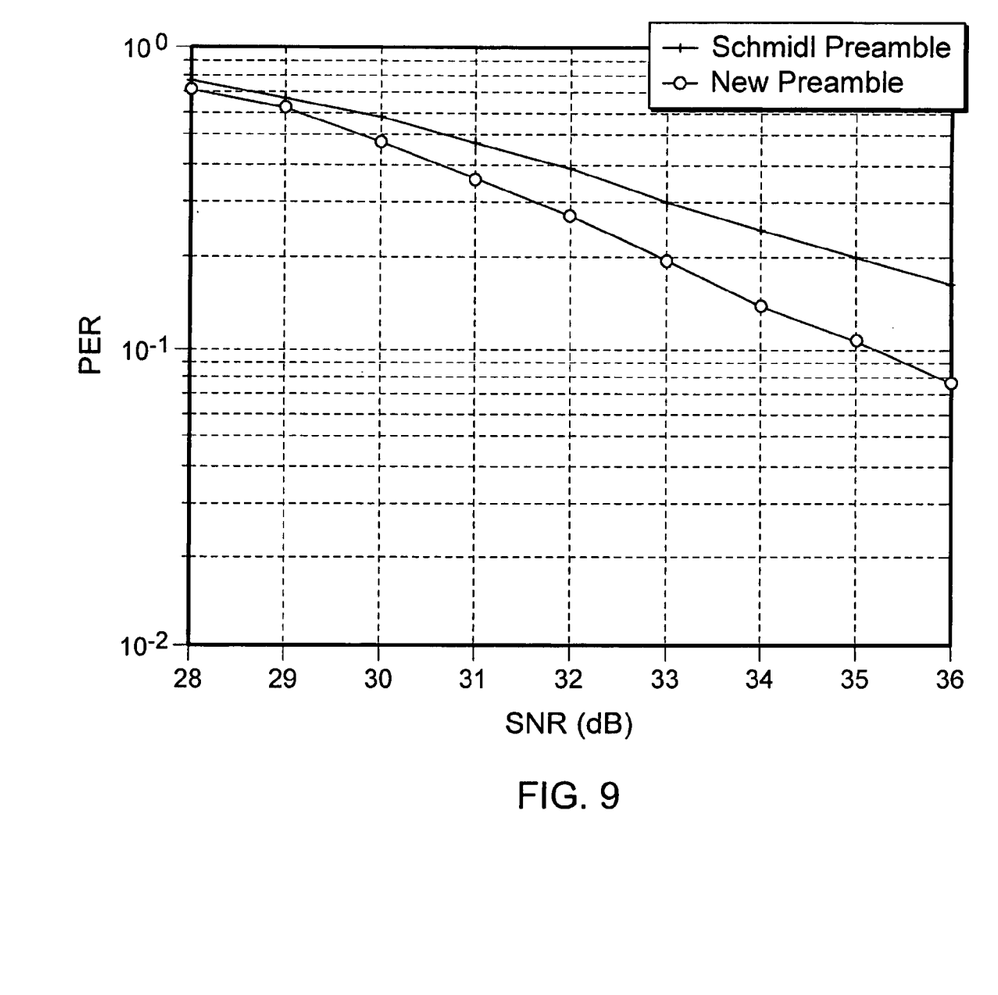
FIG. 9 is plot showing simulated results in a 3×3 MIMO system using the pilot symbol structure shown in FIG. 5.

A second set of simulation results shows the performance of SISO (single-in-single-out) and MIMO systems assuming an indoor channel with 50 nsec RMS delay spread. FIGS. 7-9 show the performance of 1×1 (SISO), 2×2 (MIMO), and 3×3 (MIMO) systems, respectively. The plots show that with the increase in the order of the MIMO systems (which implement minimum mean-squared error (MMSE) equalizers), the impact of the improved channel estimates is more pronounced. For these simulations, it is assumed that the frequency estimation is as good as that obtained using the Schmidl technique because an additional OFDM pilot symbol (L0) is transmitted.

The embodiments described above may provide cleaner channel estimates than conventional methods without compromising the synchronization capabilities of the receiver. The channel estimates so obtained may be used as the starting point for existing algorithms used to estimate ICI which, while attractive in theory, may perform poorly in practice because of poor channel estimates. For example, quadrature imbalance estimation algorithms exist which use the channel estimates for parameter estimation. However, the preliminary channel estimates themselves may be corrupted by quadrature imbalance effects and consequently the algorithms seldom work well in practice. With the above proposed scheme the quadrature effects are mitigated considerably, making such estimation algorithms meaningful and viable. Also, the impact of cleaner channel estimates may be more pronounced when used in multiple-antenna systems like MISO (Multiple-In-Single-Out), SIMO (Single-In-Multiple-Out), and MIMO systems, where the need for cleaner channel estimates is greater than that in conventional single antenna SISO systems. Simulations have shown improvements of the order of a 0.5 dB to 1.0 dB for SISO systems, with larger gains for MIMO systems. The overhead due to the additional OFDM symbol may be offset by appreciable gains in performance.

Although IEEE 802.11a systems have been described, the techniques may be used in other OFDM system, such as IEEE 802.11g, IEEE 802.16 systems and future OFDM systems.

A number of embodiments have been described. Nevertheless, it will be understood that various modifications may be made without departing from the spirit and scope of the invention. Accordingly, other embodiments are within the scope of the following claims.

The invention claimed is:

1. A method performed by at least one device of a communication system, the method comprising: transmitting a pilot symbol structure including a first pilot symbol including pilot information on a first plurality of alternate tones, and a second pilot symbol including pilot information on a second plurality of alternate tones, wherein the tones in the second plurality of alternate tones and the first plurality of alternate tones are on opposite sides of and a same distance from a tone.

2. The method of claim 1, wherein the first pilot symbol and second pilot symbol comprise OFDM (Orthogonal Frequency Division Multiplexing) symbols.

3. The method of claim 1, wherein the pilot symbol structure further includes a third pilot symbol, the third pilot symbol being identical to the first pilot symbol.

4. The method of claim 3, wherein the third pilot symbol is between the first pilot symbol and the second pilot symbol.

5. The method of claim 1, wherein the transmitting comprises transmitting in a system selected from a multiple-in-multiple-out (MIMO) system, a single-in-multiple-out (SIMO) system, a multiple-in-single-out (MISO) system, and a single-in-single-out (SISO) system.

6. The method of claim 1, wherein the transmitting comprising transmitting in a system selected from an IEEE 802.11a system, an IEEE 802.11g system, and an IEEE 802.16 system.

7. The method of claim 1, wherein in the first and second pilot symbols, the tones not containing pilot information are nulled out.

8. A method performed by at least one device of a communication system, the method comprising: receiving a pilot symbol structure including a first pilot symbol including pilot information on a first plurality of alternate tones, and a second pilot symbol including pilot information on a second plurality of alternate tones, wherein the tones in the second plurality of alternate tones and the first plurality of alternate tones are on opposite sides of and a same distance from a tone; and performing channel estimation using the first and second pilot symbols.

9. The method of claim 8, wherein the first pilot symbol and second pilot symbol comprise OFDM (Orthogonal Frequency Division Multiplexing) symbols.

10. The method of claim 8, wherein the pilot symbol structure further includes a third pilot symbol, the third pilot symbol being identical to the first pilot symbol.

11. The method of claim 10, wherein the third pilot symbol is between the first pilot symbol and the second pilot symbol.

12. The method of claim 10, further comprising:
performing a frequency offset estimation operation using the first and third pilot symbols.

13. The method of claim 8, wherein the receiving comprises receiving in a system selected from a multiple-in-multiple-out (MIMO) system, a single-in-multiple-out (SIMO) system, a multiple-in-single-out (MISO) system, and a single-in-single-out (SISO) system.

14. The method of claim 8, wherein the receiving comprising receiving in a system selected from an IEEE 802.11a system, an IEEE 802.11g system, and an IEEE 802.16 system.

15. The method of claim 8, wherein in the first and second pilot symbols, the tones not containing pilot information are nulled out.

16. An apparatus comprising:
a transmit section that generates a pilot symbol structure including
a first pilot symbol including pilot information on a first plurality of alternate tones, and
a second pilot symbol including pilot information on a second plurality of alternate tones, wherein the tones in the second plurality of alternate tones and the first plurality of alternate tones are on opposite sides of and a same distance from a tone.

17. The apparatus of claim 16, wherein the first pilot symbol and second pilot symbol comprise OFDM (Orthogonal Frequency Division Multiplexing) symbols.

18. The apparatus of claim 16, wherein the pilot symbol structure further includes a third pilot symbol, the third pilot symbol being identical to the first pilot symbol.

19. The apparatus of claim 18, wherein the third pilot symbol is between the first pilot symbol and the second pilot symbol.

20. The apparatus of claim 16, wherein the transmit section formats data according to a standard selected from an IEEE 802.11a standard, an IEEE 802.11g standard, and an IEEE 802.16 standard.

21. The apparatus of claim 16, wherein in the first and second pilot symbols, the tones not containing pilot information are nulled out.

22. An apparatus comprising:
a channel estimation module that
receives a pilot symbol structure including
a first pilot symbol including pilot information on a first plurality of alternate tones, and
a second pilot symbol including pilot information on a second plurality of alternate tones, wherein the tones in the second plurality of alternate tones and the first plurality of alternate tones are on opposite sides of and a same distance from a tone; and
performs channel estimation using the first and second pilot symbols.

23. The apparatus of claim 22, wherein the first pilot symbol and second pilot symbol comprise OFDM (Orthogonal Frequency Division Multiplexing) symbols.

24. The apparatus of claim 22, wherein the pilot symbol structure further includes a third pilot symbol, the third pilot symbol being identical to the first pilot symbol.

25. The apparatus of claim 24, wherein the third pilot symbol is between the first pilot symbol and the second pilot symbol.

26. The apparatus of claim 24, further comprising:
a frequency offset estimation module to perform a frequency offset estimation operation using the first and third pilot symbols.

27. The apparatus of claim 22, wherein in the first and second pilot symbols, the tones not containing pilot information are nulled out.

28. An apparatus comprising:
means for generating a pilot symbol structure including
means for generating a first pilot symbol including pilot information on a first plurality of alternate tones, and
means for generating a second pilot symbol including pilot information on a second plurality of alternate tones, wherein the tones in the second plurality of alternate tones and the first plurality of alternate tones are on oppsite sides of and a same distance from a tone.

29. The apparatus of claim 28, wherein the first pilot symbol and second pilot symbol comprise OFDM (Orthogonal Frequency Division Multiplexing) symbols.

30. The apparatus of claim 28, wherein the pilot symbol structure further includes a third pilot symbol, the third pilot symbol being identical to the first pilot symbol.

31. The apparatus of claim 30, wherein the third pilot symbol is between the first pilot symbol and the second pilot symbol.

32. The apparatus of claim 28, wherein the means for generating is operative to format data according to a standard selected from an IEEE 802.11a standard, an IEEE 802.11g standard, and an IEEE 802.16 standard.

33. The apparatus of claim 28, wherein in the first and second pilot symbols, the tones not containing pilot information are nulled out.

34. An apparatus comprising:
means for channel estimation including
means for receiving a pilot symbol structure including
a first pilot symbol including pilot information on a first plurality of alternate tones, and
a second pilot symbol including pilot information on a second plurality of alternate tones, wherein the tones in the second plurality of alternate tones and the first plurality of alternate tones are on opposite sides of and a same distance from a tone; and
means for performing channel estimation using the first and second pilot symbols.

35. The apparatus of claim 34, wherein the first pilot symbol and second pilot symbol comprise OFDM (Orthogonal Frequency Division Multiplexing) symbols.

36. The apparatus of claim 34, wherein the pilot symbol structure further includes a third pilot symbol, the third pilot symbol being identical to the first pilot symbol.

37. The apparatus of claim 36, wherein the third pilot symbol is between the first pilot symbol and the second pilot symbol.

38. The apparatus of claim 36, further comprising:
means for frequency offset estimation, the means including
means for performing a frequency offset estimation operation using the first and third pilot symbols.

39. The apparatus of claim 34, wherein in the first and second pilot symbols, the tones not containing pilot information are nulled out.

40. A system comprising:
one or more antennas to transmit signals; and
a transmit section to generate the signals for transmission from the one or more antennas, the transmit section operable to generate a pilot symbol structure including
a first pilot symbol including pilot information on a first plurality of alternate tones, and
a second pilot symbol including pilot information on a second plurality of alternate tones, wherein the tones in the second plurality of alternate tones and the first plurality of alternate tones are on opposite sides of and a same distance from a tone.

41. The system of claim 40, wherein the first pilot symbol and second pilot symbol comprise OFDM (Orthogonal Frequency Division Multiplexing) symbols.

42. The system of claim 40, wherein the pilot symbol structure further includes a third pilot symbol, the third pilot symbol being identical to the first pilot symbol.

43. The system of claim 42, wherein the third pilot symbol is between the first pilot symbol and the second pilot symbol.

44. The system of claim 40, wherein the transmit section is operative to format data according to a standard selected from an IEEE 802.11a standard, an IEEE 802.11g standard, and an IEEE 802.16 standard.

45. The system of claim 40, wherein in the first and second pilot symbols, the tones not containing pilot information are nulled out.

46. The system of claim 40, wherein the system is selected from a multiple-in-multiple-out (MIMO) system, a single-in-multiple-out (SIMO) system, a multiple-in-single-out (MISO) system, and a single-in-single-out (SISO) system.

47. A system comprising:
one or more antennas to receive signals; and
a receive section to receive the signals from the one or more antennas, the receive section including
a channel estimation module operative to
receive a pilot symbol structure including
a first pilot symbol including pilot information on a first plurality of alternate tones, and
a second pilot symbol including pilot information on a second plurality of alternate tones, wherein the tones in the second plurality of alternate tones and the first plurality of alternate tones are on opposite sides of and a same distance from a tone; and
perform channel estimation using the first and second pilot symbols.

48. The system of claim 47, wherein the first pilot symbol and second pilot symbol comprise OFDM (Orthogonal Frequency Division Multiplexing) symbols.

49. The system of claim 47, wherein the pilot symbol structure further includes a third pilot symbol, the third pilot symbol being identical to the first pilot symbol.

50. The system of claim 49, wherein the third pilot symbol is between the first pilot symbol and the second pilot symbol.

51. The system of claim 49, further comprising:
a frequency offset estimation module to perform a frequency offset estimation operation using the first and third pilot symbols.

52. The system of claim 47, wherein in the first and second pilot symbols, the tones not containing pilot information are nulled out.

53. The system of claim 47, wherein the system is selected from a multiple-in-multiple-out (MIMO) system, a single-in-multiple-out (SIMO) system, a multiple-in-single-out (MISO) system, and a single-in-single-out (SISO) system.

54. A system comprising:
means for transmitting signals in a wireless channel; and
means for generating the signals for transmission, the means including
means for generating a pilot symbol structure including
a first pilot symbol including pilot information on a first plurality of alternate tones, and
a second pilot symbol including pilot information on a second plurality of alternate tones, wherein the tones in the second plurality of alternate tones and the first plurality of alternate tones are on opposite sides of and a same distance from a tone.

55. The system of claim 54, wherein the first pilot symbol and second pilot symbol comprise OFDM (Orthogonal Frequency Division Multiplexing) symbols.

56. The system of claim 54, wherein the pilot symbol structure further includes a third pilot symbol, the third pilot symbol being identical to the first pilot symbol.

57. The system of claim 56, wherein the third pilot symbol is between the first pilot symbol and the second pilot symbol.

58. The system of claim 54, wherein the means for generating the pilot symbol structure is operative to format data according to a standard selected from an IEEE 802.11a standard, an IEEE 802.11g standard, and an IEEE 802.16 standard.

59. The system of claim 54, wherein in the first and second pilot symbols, the tones not containing pilot information are nulled out.

60. The system of claim 54, wherein the system is selected from a multiple-in-multiple-out (MIMO) system, a single-inmultiple-out (SIMO) system, a multiple-in-single-out (MISO) system, and a single-in-single-out (SISO) system.

61. A system comprising:
  means for receiving signals from a wireless channel; and
  means for estimating the wireless channel including
    means for receiving a pilot symbol structure including
      a first pilot symbol including pilot information on a first plurality of alternate tones, and
      a second pilot symbol including pilot information on a second plurality of alternate tones, wherein the tones in the second plurality of alternate tones and the first plurality of alternate tones are on opposite sides of and a same distance from a tone; and
    means for performing channel estimation using the first and second pilot symbols.

62. The system of claim 61, wherein the first pilot symbol and second pilot symbol comprise OFDM (Orthogonal Frequency Division Multiplexing) symbols.

63. The system of claim 61, wherein the pilot symbol structure further includes a third pilot symbol, the third pilot symbol being identical to the first pilot symbol.

64. The system of claim 63, wherein the third pilot symbol is between the first pilot symbol and the second pilot symbol.

65. The system of claim 63, further comprising:
  means for frequency offset estimation, the means including means for performing a frequency offset estimation operation using the first and third pilot symbols.

66. The system of claim 61, wherein in the first and second pilot symbols, the tones not containing pilot information are nulled out.

67. The system of claim 61, wherein the system is selected from a multiple-in-multiple-out (MIMO) system, a single-in-multiple-out (SIMO) system, a multiple-in-single-out (MISO) system, and a single-in-single-out (SISO) system.

* * * * *